Jan. 24, 1933.   F. PORTER   1,895,086
APPARATUS FOR THE MANUFACTURE OF BENZOL AND VALUABLE
BY-PRODUCTS FROM A GAS CONTAINING EITHER BUTANE,
PROPANE, OR ETHANE, OR PORTIONS OF EACH
Original Filed April 27, 1927   3 Sheets-Sheet 1

INVENTOR.
Frank Porter
BY Thos. C. Scofield
ATTORNEY.

Jan. 24, 1933.  F. PORTER  1,895,086
APPARATUS FOR THE MANUFACTURE OF BENZOL AND VALUABLE
BY-PRODUCTS FROM A GAS CONTAINING EITHER BUTANE,
PROPANE, OR ETHANE, OR PORTIONS OF EACH
Original Filed April 27, 1927  3 Sheets-Sheet 3

INVENTOR.
Frank Porter
BY
Thos. E. Scofield
ATTORNEY.

Patented Jan. 24, 1933

1,895,086

UNITED STATES PATENT OFFICE

FRANK PORTER, OF SYRACUSE, NEW YORK, ASSIGNOR TO CONTINENTAL OIL COMPANY, OF PONCA CITY, OKLAHOMA, A CORPORATION OF DELAWARE

APPARATUS FOR THE MANUFACTURE OF BENZOL AND VALUABLE BY-PRODUCTS FROM A GAS CONTAINING EITHER BUTANE, PROPANE, OR ETHANE, OR PORTIONS OF EACH

Original application filed April 27, 1927, Serial No. 186,851. Divided and this application filed January 18, 1930. Serial No. 421,800.

This application is a division of my co-pending application Serial No. 186,851, filed April 27, 1927.

This invention relates to the production of benzol and by-products by the pyrogenic decomposition of a refinery gas containing either butane, ethane or propane at a high temperature, and the subsequent cooling of the mixture so obtained and the extraction of the benzol and the valuable by-products. The invention further relates to the provision of simple apparatus whereby said process may be efficiently carried out.

For the sake of brevity I shall designate by "valuable by-products" a number of compounds which are produced along with benzol by my process, and of which the following is a partially complete list and may be taken as examples of others of similar composition and having similar properties. The term may be understood to include either the separate purified or partially purified compounds or mixtures of a number of the said compounds in varying proportions, of which the following are examples:

Toluene, xylenes, naphthalene, phenanthrene, ethylbenzene, propylbenzene, cumene, pseudo-cumene, cymene, mesitylene, methyl naphthalene, ethyl naphthalene, acetylene, ethylene, propylene and hydrogen.

The operation upon the hydrocarbon gas to produce the benzol and valuable by-products will be designated as "cracking".

It is a well known fact that small amounts of aromatic hydrocarbons may be made by heating hydrocarbon gases to a high temperature. Previously, however, the exact conditions have not been specified such as to make the yield sufficiently large, nor has an apparatus of such an arrangement been designed or constructed as to make the manufacture of benzol from such gases a venture of any considerable commercial importance.

The primary object of this invention is to provide a process in which the hydrocarbon refinery gases are treated at the proper temperatures and for the proper time, and under conditions hereinafter specified, so as to give yields of benzol and valuable by-products larger than heretofore obtained.

Another object of the present invention is to provide a process for the extraction and purification of said benzol and valuable by-products.

A further object of the invention is to provide apparatus suitable to carry out the above-mentioned processes.

In the accompanying drawings are shown examples of an apparatus in diagrammatic form in which the process herein specified may be carried out.

Figure 1:
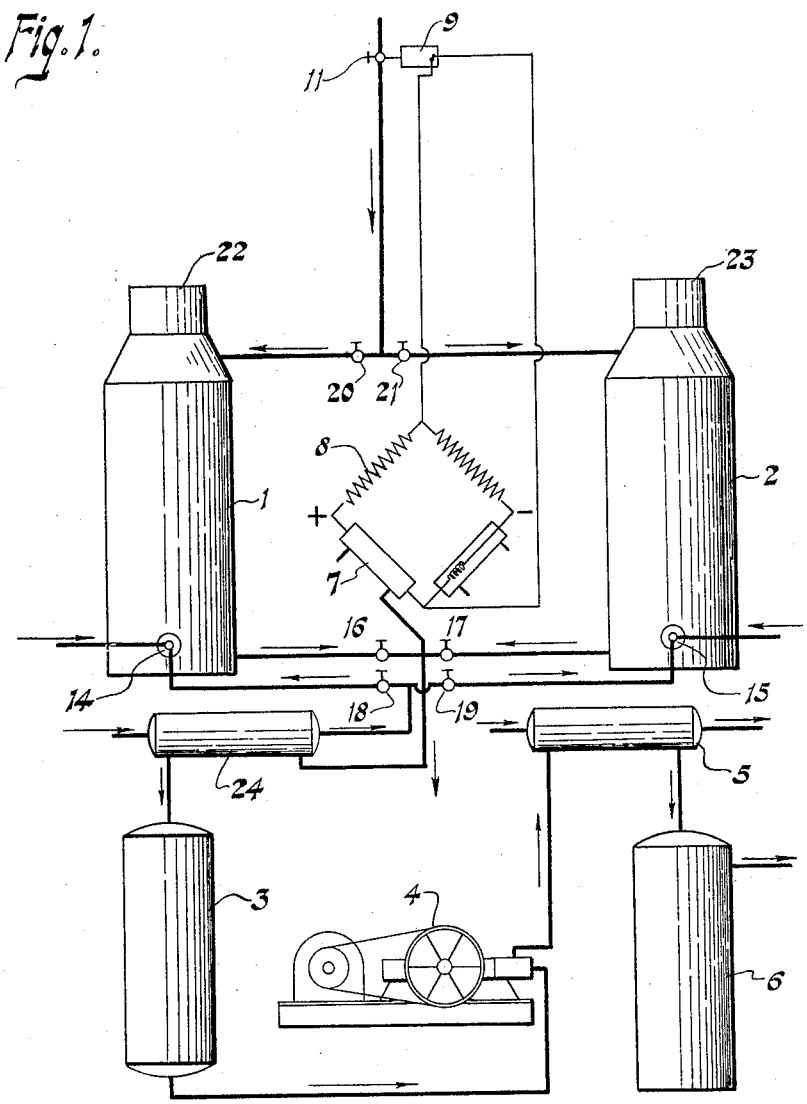
Fig. 1 shows one form of apparatus which I shall designate as the intermittent form.
Figure 2:
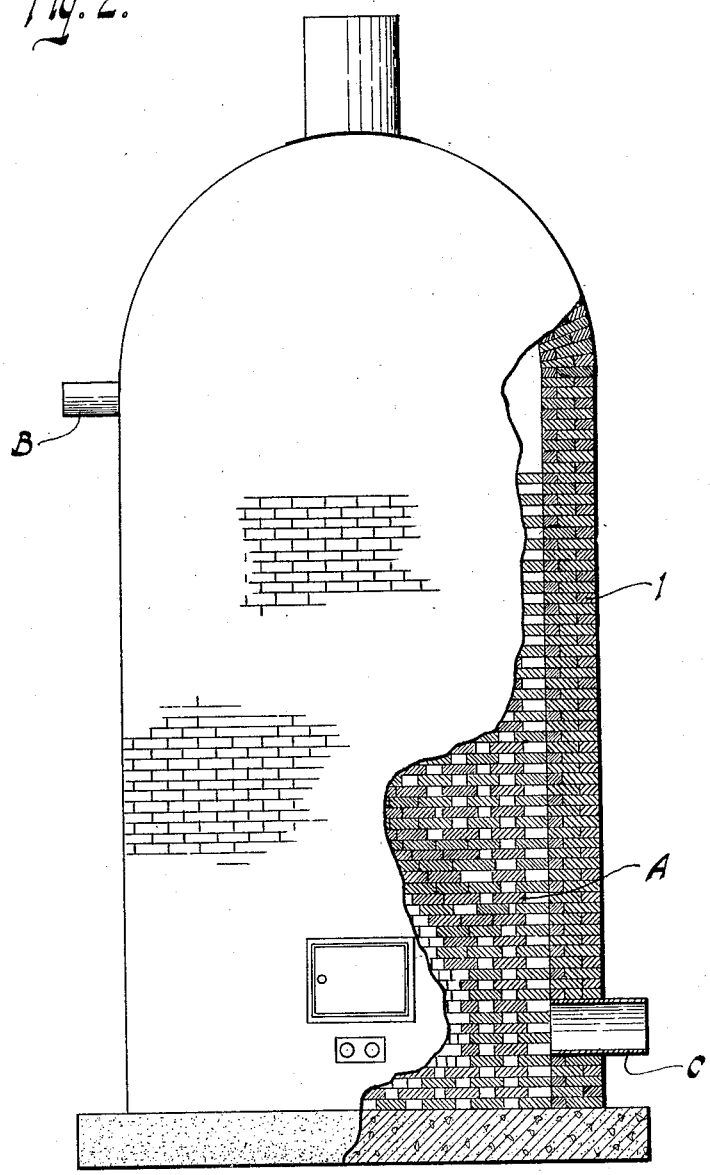
Fig. 2 illustrates one of my furnaces, partially in elevation and partly in vertical section.

The furnaces which are designated by the reference characters 1 and 2 in Fig. 1 and one of which is shown more fully in Fig. 2 contain each a large amount of surface such as obtained by the use of a checker of brick A of some refractory material, such as fire clay or silica, and are provided each with a gas inlet B and a gas outlet C. The furnaces 1 and 2 are internally heated by a burner from which the flame and hot gas come in direct contact with the checker brick, said heating taking place before the gas to be cracked in passed through the furnace. When the furnace has been heated sufficiently the burner is closed off, the port at which the flame entered is closed, and the gas to be "cracked" is passed downward through the furnace tortuously, where, under the influence of the high temperature within the furnace, the benzol and valuable by-products are formed.

For smoothness of operation the furnaces are used alternately so that one is being heated while the other is used for cracking. From the bottom of the furnace in which a cracking operation has taken place the products pass out and are cooled in a heat exchanger 24 by the cool air being supplied to the other furnace during the heating thereof, and the liquid or material carried in suspension, designated as "tar", is separated in the tar extraction 3 by settling, washing, centrifuging, electrical precipitation, or other means, or any combination of these means of separation. The benzol is then separated from the residual gas by compression, oil absorption, or solid absorbents. In the drawing the compression method is shown merely by way of illustration. The compressor 4 compresses the gas after it has been passed through the furnace, after which the cooler 5 cools the gas and the benzol containing liquid condensate accumulates and is separated from the residual gas in the accumulator or trap 6 (Fig. 1).

In the intermittent form just described, because the flame is withdrawn the temperature of the heating surface does not stay constant, but decreases continuously as the gas is cracked. I have found that the best yields are obtained by causing the gas to flow over the heating surface at a certain definite speed corresponding to each temperature, and therefore to obtain the best yields with the intermittent form of apparatus the speed must be continuously varied, i. e., slowed down. To obtain these conditions I pass a small portion of the gas from the outlet of the furnace through the cell of a katharometer or thermal conductivity unit 7. When the thermal conductivity unit 7 is properly adjusted so that gas cracked to give the best yield causes the resistance bridge 8 to be in balance, I have found that slight variations from the proper flow cause the bridge to be unbalanced and that the deflection of the galvanometer 9 placed across the bridge may be amplified by means of any one of a number of devices known to those skilled in the art to obtain an impulse sufficient to adjust a throttle valve 11 on the direct line supplying the gas to the furnace. The arrangement is such that the throttle valve is adjusted in the direction to give the proper flow through the furnace for the best yield. This in turn tends to bring the bridge into balance.

A very general method for the continuous analysis of gaseous mixtures depends upon the fact that thermal conductivities of the individual gases differ widely. The possibility of the use of the thermal conductance method in automatic gas analysis has long been recognized.

I am aware that other physical properties of the cracked gas, such as specific gravity, might be arranged by one skilled in the art to operate the inlet valve in much the same manner.

The ports and valves 14, 15, 16, 17, 18, 19, 20, 21, 22 and 23, with the exception of the throttle valve described above, are operated by a cam which is operated by a clockwork and is adjusted to bring about the proper cycle of heating and cracking, but for simplicity I have not shown the cam or clockwork in the drawings.

In Fig. 1 I have shown, for simplicity, only two furnaces, but it is obvious that more than two may be used, or that other parts may be constructed in multiple without altering the character of the invention.

Figure 3:
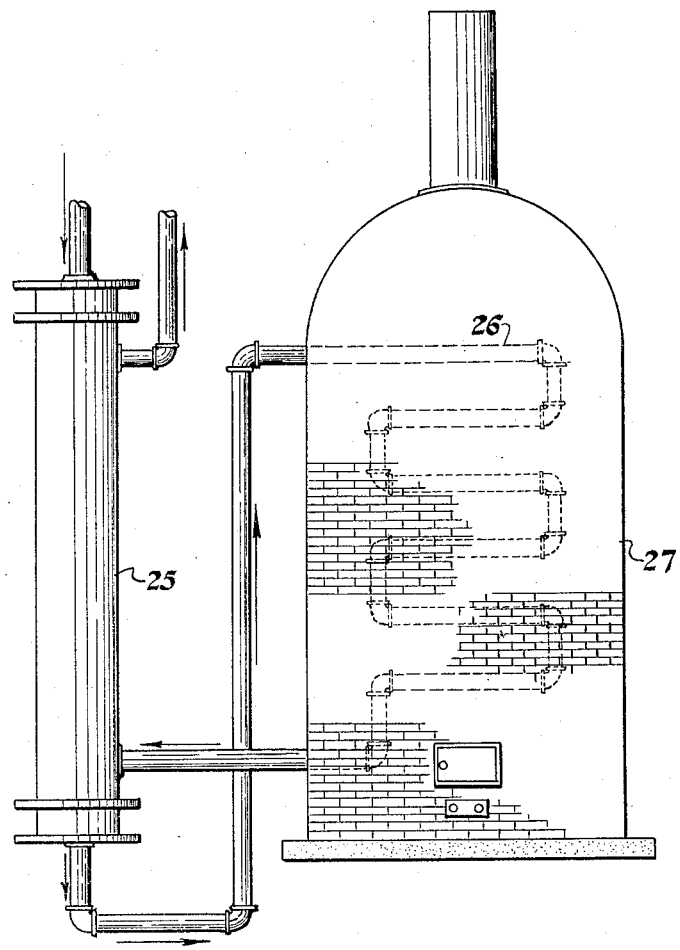
Fig. 3 illustrates an optional form of apparatus which I may employ and which I shall designate as the continuous form of apparatus for carrying out the process.

In Fig. 3 there is shown an optional apparatus which I have designated as a continuous form. The gas is passed through a heat exchanger 25, where heat is transferred to it from the hot cracked gas. The gas is then passed through a series of pipes 26 enclosed in a furnace 27. The temperature of the furnace and the flow of the gas is adjusted so that the gas is properly cracked.

It is important to construct the tubes in which the gas is heated in the furnace of a material that does not exert a harmful catalytic effect on the yield of benzol. I have found that iron and nickel and similar metals have a harmful catalytic influence and are therefore not suitable as a material from which to construct the heating surface. They may be used only when coated with a material which protects the surface from coming in contact with the gas. For example, I have found that an iron tube coated with chromium or tin is suitable for use as a heating surface inside the furnace. The procedure for the extraction of tar and the recovery of the benzol is the same in the continuous as in the intermittent form of the apparatus, and is therefore not shown in Fig. 3.

The separation and purification of the benzol and valuable liquid or solid by-products may be accomplished by any of the methods now known to the art of manufacture of such products from coal gas.

The separation of acetylene from the cracked gas may be accomplished by the use of an organic solvent, such as acetone, which is circulated in an absorber continuously, countercurrent to and in direct contact with the stream of gas, and thence to a still where the acetylene is separated by heat or reduced pressure, or both. An optional method is the use of an aqueous solution of a metallic salt, such as ammoniacal cuprous chloride, with which the acetylene reacts to form a metallic acetylide. The solution is then regenerated by heating, or by the addition of acids, until the acetylene is removed, and then bringing it back to its original alkalinity for recirculating.

Th acetylene may by an optional process be separated by absorption in activated charcoal. After the charcoal is saturated with acetylene, the acetylene is distilled from the charcoal by admitting steam or other vapor at a high temperature.

Care should be taken to remove all tar or other high boiling products before admitting to the charcoal since these are difficult to remove from the charcoal.

The concentration and purification of acetylene may be carried further by passing the crude acetylene distilled from the charcoal through fresh charcoal, or by a combination of the charcoal process with other optional acetylene extraction processes described above.

The acetylene and benzol may, by an optional process, be extracted at the same time by means of activated charcoal.

It has been found that the greater the proportions of butane, propane or ethane taken in order in the gas, the greater the yield of benzol will be, and for this reason it is highly desirable to use the gas from rectifiers, stabilizers, or recompressors in use in the natural gasoline industry.

The temperature to which the gas must be heated depends, as previously indicated, on the time to which it is subjected to the temperature. In general, it may be stated that the proper cracking temperature to which the gas must reach ranges from around 825° C. to 950° C.

The tar produced contains very little, less than 1 per cent, of phenol and cresols or aromatic compounds containing less than 1 per cent thereof, and should serve as a valuable raw material for the manufacture of products where contamination with sulfur compounds is undesirable. I have found that the gas may contain around 1 per cent to 2 per cent acetylene, around 7 per cent unsaturated hydrocarbons of the ethylene group, and that it may contain as much as 50 per cent hydrogen. All these constituents have added value, due to the low per cent of sulfur.

Provided tubes of material other than iron, nickel or similar metals are used, only a small percentage of the gas entering the tubes in the continuous process is decomposed according to a side reaction with the deposition of carbon black. However, the small amount that does occur may be removed periodically by interrupting the flow of gas to be cracked and passing instead air, steam, or carbon dioxide or gases containing a considerable proportion of these, through the tubes while they are at a high enough temperature for the carbon to react with said gases and be removed as carbon monoxide.

Various changes in the specific process herein described and in the specific apparatus as shown and described may be made within the scope of the claims without materially departing from the spirit of my invention.

I claim as my invention:

1. An apparatus for the production of benzol and by-products from a gaseous hydrocarbon material comprising a plurality of furnaces adapted to be alternately heated, inlet lines leading to said furnaces for introducing gaseous hydrocarbon material alternately thereto, heating means for the furnaces and means for cooling the gas after it has been discharged from the furnace, a tar extractor for removing liquid from the cracked gas, and a compressor connected to the tar extractor, and an accumulating and separating tank for removing benzol from the remaining gases.

2. An apparatus for the production of benzol and by-products from a gaseous hydrocarbon material comprising a plurality of furnaces adapted to be alternately heated, pipes leading to said furnaces and means for cooling the gas on its discharge from the furnaces, a tar extractor interposed in the discharge line from the furnaces, a compressor connected to the tar extractor, means for cooling the gas discharged from the compressor, and a receiving tank for separating benzol from the remaining gas on its discharge from said compressor.

In testimony whereof I affix my signature.

FRANK PORTER.